United States Patent
Shisler et al.

(10) Patent No.: US 11,747,063 B2
(45) Date of Patent: Sep. 5, 2023

(54) HEAT EXCHANGER ASSEMBLY WITH VALVE

(71) Applicant: Modine Manufacturing Company, Racine, WI (US)

(72) Inventors: Kyle Shisler, Muskego, WI (US); Thomas Klaves, Burlington, WI (US)

(73) Assignee: MODINE MANUFACTURING COMPANY, Racine, WI (US)

( * ) Notice: Subject to any disclaimer, the term of this patent is extended or adjusted under 35 U.S.C. 154(b) by 36 days.

(21) Appl. No.: 17/580,600

(22) Filed: Jan. 20, 2022

(65) Prior Publication Data

US 2022/0228783 A1 Jul. 21, 2022

Related U.S. Application Data

(60) Provisional application No. 63/140,253, filed on Jan. 21, 2021.

(51) Int. Cl.
*F25B 41/345* (2021.01)
*F25B 39/02* (2006.01)

(52) U.S. Cl.
CPC .......... *F25B 41/345* (2021.01); *F25B 39/028* (2013.01); *F25B 2600/2513* (2013.01)

(58) Field of Classification Search
CPC .................. F25B 41/345; F25B 39/028; F25B 2600/2531; F25B 2700/191; F25B 2700/21174; F25B 39/02; F25B 41/347; F28F 13/10; F28F 13/06; F28F 27/02; F28D 2021/0071
See application file for complete search history.

(56) References Cited

U.S. PATENT DOCUMENTS

| 4,319,630 A | * | 3/1982 | Hronek ..................... F28D 7/06 165/70 |
| 6,253,837 B1 | * | 7/2001 | Seiler ....................... F28F 27/02 137/625.29 |

(Continued)

FOREIGN PATENT DOCUMENTS

| EP | 0171240 A2 | 2/1986 |
| EP | 1707903 A2 | 10/2006 |
| EP | 3249322 A1 | 11/2017 |

OTHER PUBLICATIONS

International Search Report with Written Opinion for related Application No. PCT/US2022/013205 dated Apr. 28, 2022, (14 Pages).

*Primary Examiner* — Kun Kai Ma
(74) *Attorney, Agent, or Firm* — Michael Best & Friedrich

(57) ABSTRACT

Systems and methods for disrupting a flow of refrigerant within a heat exchanger assembly. One embodiment provides a method that includes receiving, with a controller, a first signal from a first sensor, the first signal indicative of a pressure of the refrigerant flowing through the heat exchanger. The method includes setting, with the controller, an operating frequency of a valve based on the first signal. The operating frequency includes a rate at which the valve actuates between a first valve position that sets a first refrigerant flow rate through the heat exchanger and a second valve position that sets a second refrigerant flow rate through the heat exchanger. The method includes controlling, with the controller, operation of a solenoid to actuate the valve at the operating frequency.

16 Claims, 11 Drawing Sheets

(56) References Cited

U.S. PATENT DOCUMENTS

| | | | |
|---|---|---|---|
| 10,048,025 B2 | 8/2018 | Wang et al. | |
| 2008/0093066 A1* | 4/2008 | Bird .................. | G05D 23/1333 |
| | | | 165/103 |
| 2011/0259574 A1* | 10/2011 | Angel .................... | F28F 27/02 |
| | | | 165/157 |
| 2011/0282619 A1* | 11/2011 | Laursen ................ | G01K 13/02 |
| | | | 702/182 |
| 2013/0319634 A1* | 12/2013 | Sheppard ............... | F28F 27/02 |
| | | | 165/96 |
| 2015/0362263 A1* | 12/2015 | Wang ..................... | F25B 41/38 |
| | | | 165/100 |
| 2017/0234456 A1* | 8/2017 | Fuller ................... | B23P 15/26 |
| | | | 165/96 |
| 2018/0010866 A1* | 1/2018 | Sheppard ............ | F16K 31/002 |
| 2020/0149623 A1* | 5/2020 | Muhammad ............. | F01P 11/08 |
| 2020/0332702 A1* | 10/2020 | Gerges .................... | B60H 1/03 |
| 2021/0325131 A1* | 10/2021 | Tonellato ............... | F28D 9/005 |
| 2022/0268537 A1* | 8/2022 | Livni ..................... | F28F 19/01 |

\* cited by examiner

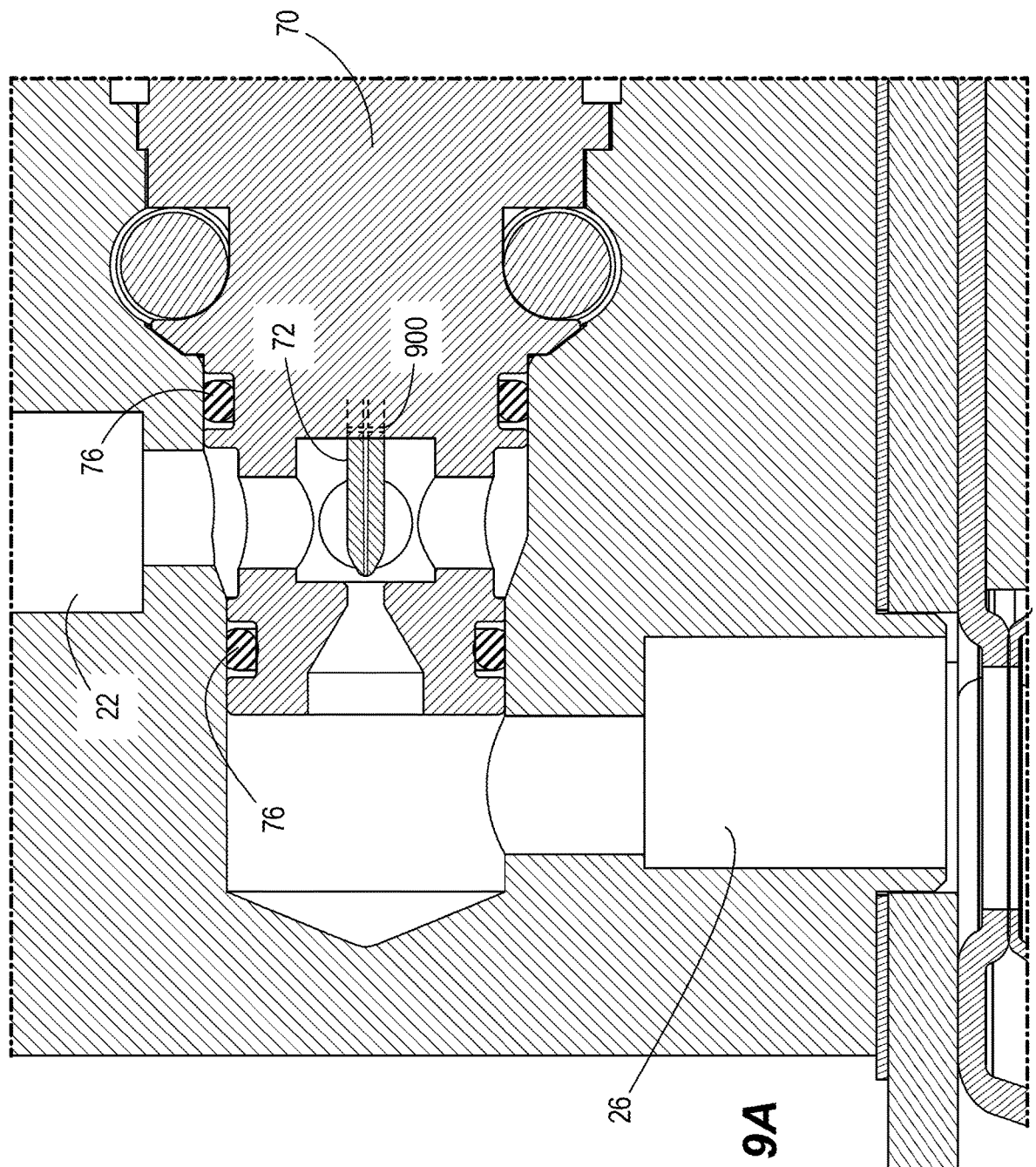

HEAT EXCHANGER ASSEMBLY WITH VALVE

RELEVANT APPLICATIONS

This application claims the benefit of U.S. Provisional Patent Application No. 63/140,253, filed Jan. 21, 2021, the entire content of which is hereby incorporated by reference.

BACKGROUND

Embodiments described herein relate to heat exchangers and, more specifically, evaporators with valve control.

Evaporators are commonly arranged within a refrigeration loop with an expansion valve upstream of the evaporator. The expansion valve configuration and operation affects the performance, efficiency, and capacity of the evaporator and the refrigeration system. Expansion valves can control the amount of liquid and vapor distributed to the evaporator.

SUMMARY

One embodiment provides a method for disrupting a flow of refrigerant through a heat exchanger. The method includes receiving, with a controller, a first signal from a first sensor, the first signal indicative of a pressure of the refrigerant flowing through the heat exchanger. The method includes setting, with the controller, an operating frequency of a valve based on the first signal. The valve regulates refrigerant flow through the heat exchanger. The operating frequency includes a rate at which the valve actuates between a first valve position that sets a first refrigerant flow rate through the heat exchanger and a second valve position that sets a second refrigerant flow rate through the heat exchanger. The method includes controlling, with the controller, operation of a solenoid to actuate the valve at the operating frequency. The refrigerant includes refrigerant in the liquid phase and refrigerant in the gaseous phase. Actuating the valve at the operating frequency disrupts the flow of the refrigerant through the heat exchanger such that when the valve is moved from the first valve position to the second valve position, the refrigerant in the liquid phase is more equally distributed through the heat exchanger.

Another embodiment provides a control system for disrupting a flow of refrigerant through a heat exchanger. The control system comprises a valve for regulating the flow of refrigerant through the heat exchanger, a solenoid coupled to the valve that actuates the valve, and a first sensor that provides signals indicative of a pressure of the flow of refrigerant within the heat exchanger. The control system also includes a controller coupled to the solenoid and the sensor, the controller including an electronic processor and a memory. The controller is configured to receive a first signal from the first sensor, set an operating frequency of the valve based on the first signal, and control operation of the solenoid to actuate the valve at the operating frequency. The operating frequency includes a rate at which the valve actuates between a first valve position that sets a first refrigerant flow through the heat exchanger and a second valve position that sets a second refrigerant flow rate through the heat exchanger. The flow of refrigerant includes refrigerant in the liquid phase and refrigerant in the gaseous phase. Actuating the valve at the operating frequency disrupts the flow of the refrigerant through the heat exchanger such that, when the valve is moved from the first valve position to the second valve position, the refrigerant in the liquid phase is more equally distributed through the heat exchanger.

Another embodiment provides a heat exchanger assembly comprising a heat exchanger core, a valve, a solenoid, a first sensor, and a controller. The heat exchanger core includes a refrigerant channel, an inlet manifold, and an outlet manifold. The valve is configured to regulate refrigerant flow into the heat exchanger core. The solenoid actuates the valve between a first valve position that sets a first refrigerant flow rate through the heat exchanger core and a second valve position that sets a second refrigerant flow rate through the heat exchanger core. The first sensor is configured to provide signals indicative of characteristics of the flow of refrigerant through the heat exchanger core. The controller includes an electronic processor and a memory. The controller is configured to receive a first signal from the first sensor, set an operating frequency of the valve based on the first signal, and control operation of the solenoid to actuate the valve at the set operating frequency. The operating frequency is the rate at which the valve actuates between the first valve position and the second valve position.

Other features, aspects, and benefits of various embodiments will become apparent by consideration of the detailed description and accompanying drawings.

BRIEF DESCRIPTION OF THE DRAWINGS

FIG. 9A is side view of the expansion valve configuration of FIG. 1 according to one embodiment.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
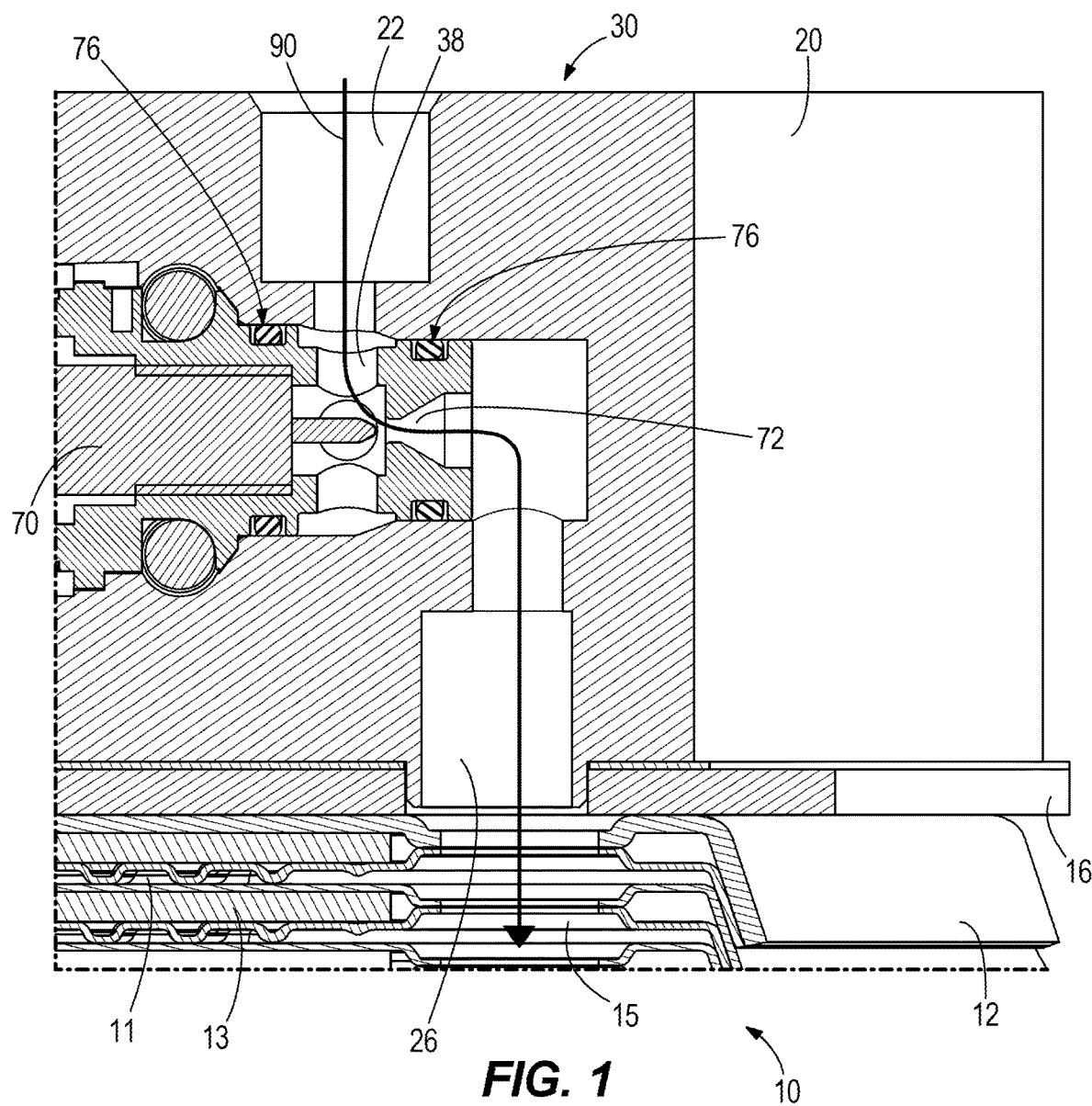
FIG. 1 is a general heat exchanger assembly with an expansion valve configuration according to one embodiment.

A heat exchanger assembly of FIG. 1 includes a heat exchanger core 10 having plates 12 stacked to form alternating coolant channels 11 and refrigerant channels 13. The coolant channels 11 and refrigerant channels 13 are in thermal contact with each other. The plates 12 extend from a bottom plate to a top plate 16. The core 10 includes a coolant inlet and a coolant outlet. A connection block 20 extends from the top plate 16 of the core 10, the connection block 20 being sealed to the core 10 by brazing, welding, or other joining methods. The connection block 20 includes an inlet 22 and an outlet. A connection block inlet channel 26 extends from the inlet 22 to an inlet manifold 15 of the core 10.

A valve assembly 30 is provided on or in the connection block 20. The valve assembly 30 includes a driving mechanism 70, which may be a solenoid or motor, such as a stepper or servo motor. The driving mechanism 70 actuates a valve 72 to open and close the valve 72 to regulate a flow of refrigerant 90 into the core 10. The valve assembly 30 has a valve assembly refrigerant channel 38 that is aligned with the connection block inlet channel 26 at least at one end of the valve assembly refrigerant channel 38 to provide refrigerant flow to the core 10.

In some embodiments, the valve 72 is actuated in a pulsing manner to reset (e.g., disrupt) the flow of refrigerant and prevent an equilibrium state of the two phases (i.e., the gas and the liquid phase of the refrigerant 90) of the refrigeration within the heat exchanger assembly. This mitigates the dry out of the refrigerant flow channels 13 within the core 10. During an equilibrium state refrigerant channels 13 with more liquid refrigerant would have less pressure drop and are a path of least resistance for more liquid refrigerant flow. This lessens the flow of liquid (i.e., increases the drying out) of other refrigerant channels 11. Pulsing or cycling the valve 72 prevents this condition and provides more equal distribution of liquid refrigerant to all of the refrigerant flow channels 11. Additionally, pulsing or cycling the valve 72 improves the performance of the evaporator by providing the more equal distribution of liquid refrigerant to all of the refrigerant flow channels 11.

Figure 2:
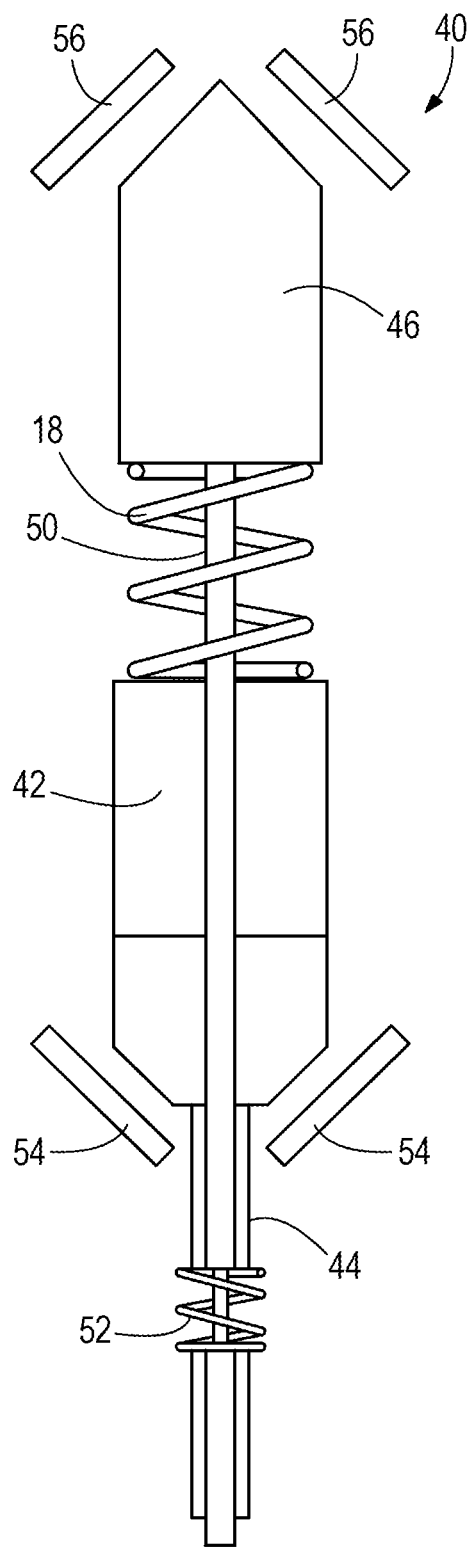
FIG. 2 is a schematic view of a distribution valve of a heat exchanger assembly according to one embodiment.
Figure 3:
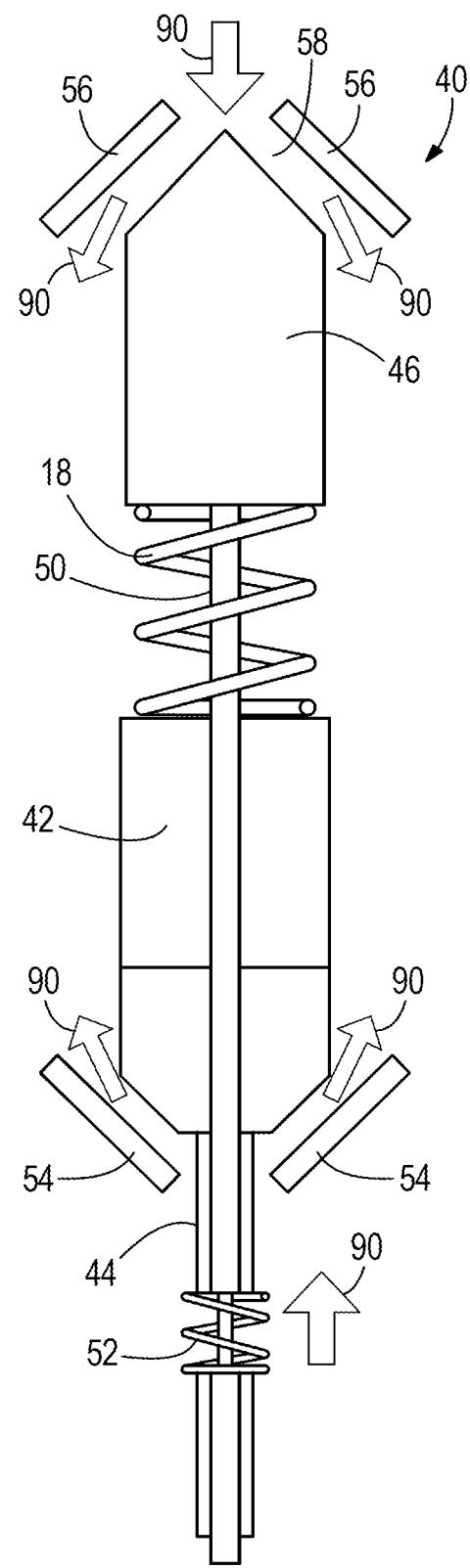
FIG. 3 is a schematic view of the distribution valve of FIG. 2 according to one embodiment.

FIG. 2 provides another embodiment where a distribution valve assembly 40 is located downstream of the valve assembly 30. The distribution valve assembly 40 includes a first valve 42 that moves independently of an included second valve 46. The first valve 42 has a first valve arm 44 with an inner channel. A second valve arm 50 is situated within the inner channel of the first valve arm 44 and translates by the second valve 46. Both the first valve 42 and the second valve 46 are driven by a second driving mechanism (not shown). Springs 18, 52 are included with the distribution valve assembly 40 to allow independent travel between the first valve 42 and the second valve 46. The first and second valves can be seated against first and second valve seats 54, 56. FIG. 3 schematically shows the flow of refrigerant through the distribution valve assembly 40. As shown in FIG. 3, the flow of refrigerant 90 enters the distribution valve assembly 40 at both ends. The first and second valves 42, 46 may be actuated such that the flow of refrigerant 90 is distributed to refrigerant channels 11 in a mostly liquid state, again being cycled to prevent an equilibrium of liquid and vaper within the heat exchanger.

Figure 4:
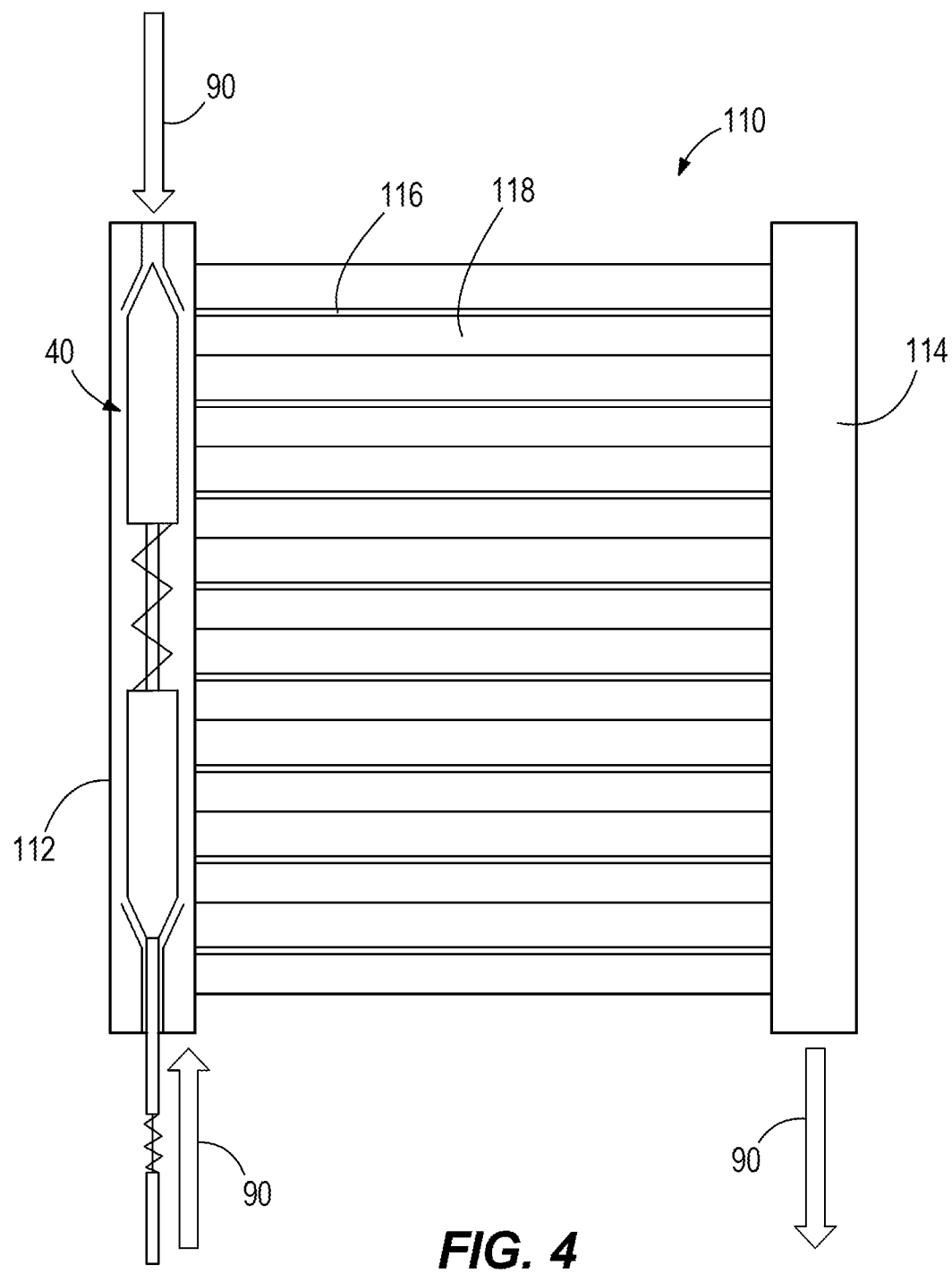
FIG. 4 is a schematic view of the distribution valve of FIG. 2 according to another embodiment.

FIG. 4 shows another embodiment of the heat exchanger assembly including an air to liquid heat exchanger core 110. The core 110 includes an inlet manifold 112 and an outlet manifold 114. Refrigerant flow tubes 116 extend between the inlet manifold 112 and the outlet manifold 114. The valve assembly 30 of FIG. 1, as discussed above, is fluidly connected to the inlet manifold 112 and is located upstream of the inlet manifold 112. In some embodiments, the distribution valve assembly 40 of the alternative embodiment of FIGS. 2 and 3 is also be included within this core 110. In embodiments where the distribution valve assembly 40 is included, refrigerant connections (not shown) are included between the valve assembly 30 and the opposites sides of the inlet manifold 112 to provide the flow of refrigerant 90 to the opposite sides of the inlet manifold 112. The distribution valve assembly 40 is actuated as described above. The flow of refrigerant 90 moves from the inlet manifold 112 through the tubes 116 to the outlet manifold 114 to transfer heat between air and the flow of refrigerant 90 within the tubes 116. The flow of refrigerant then exits the core 110 at an outlet port of the outlet manifold 114.

Figure 5:
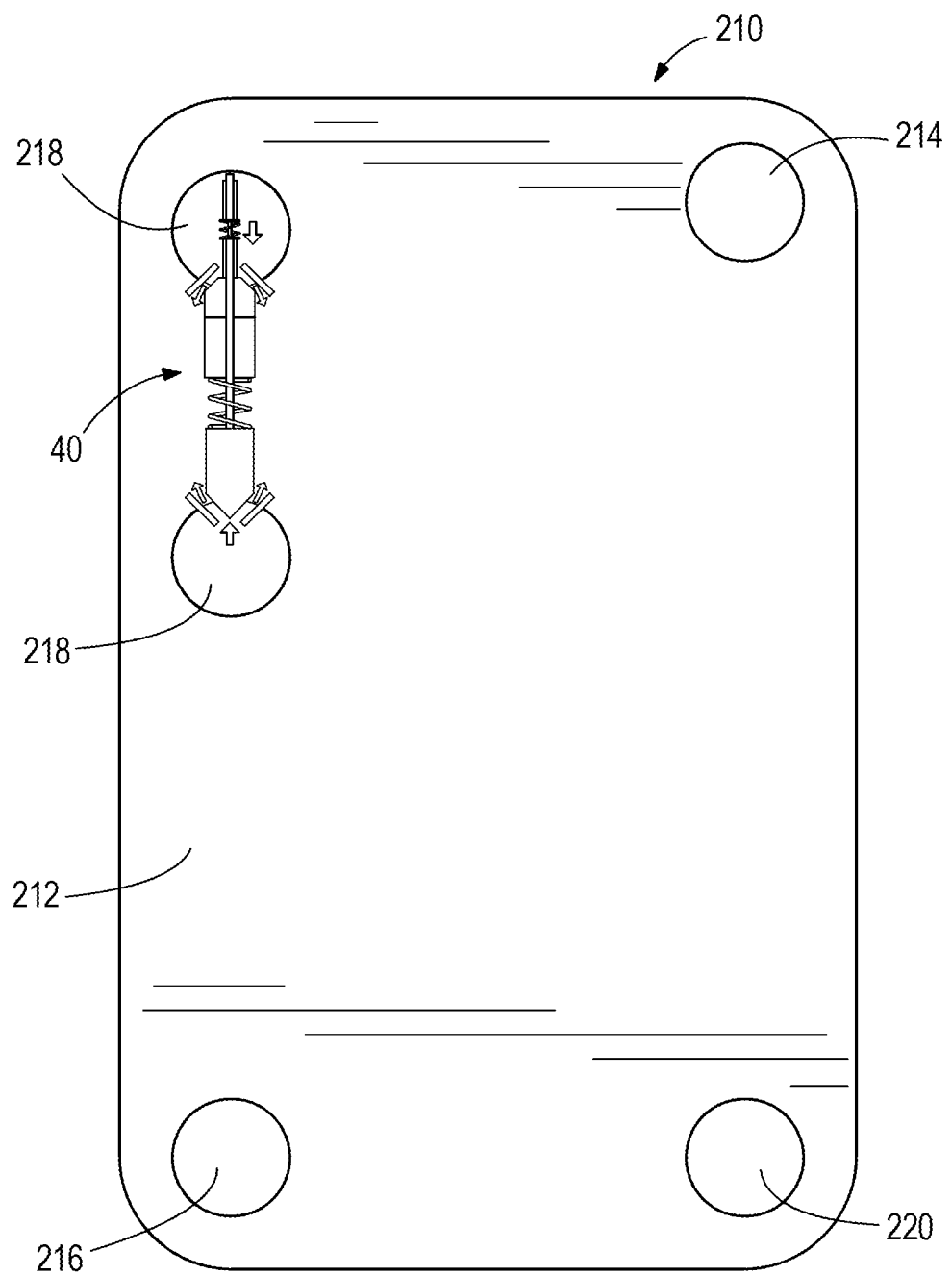
FIG. 5 is a schematic view of the distribution valve of FIG. 2 according to another embodiment.
Figure 6A:
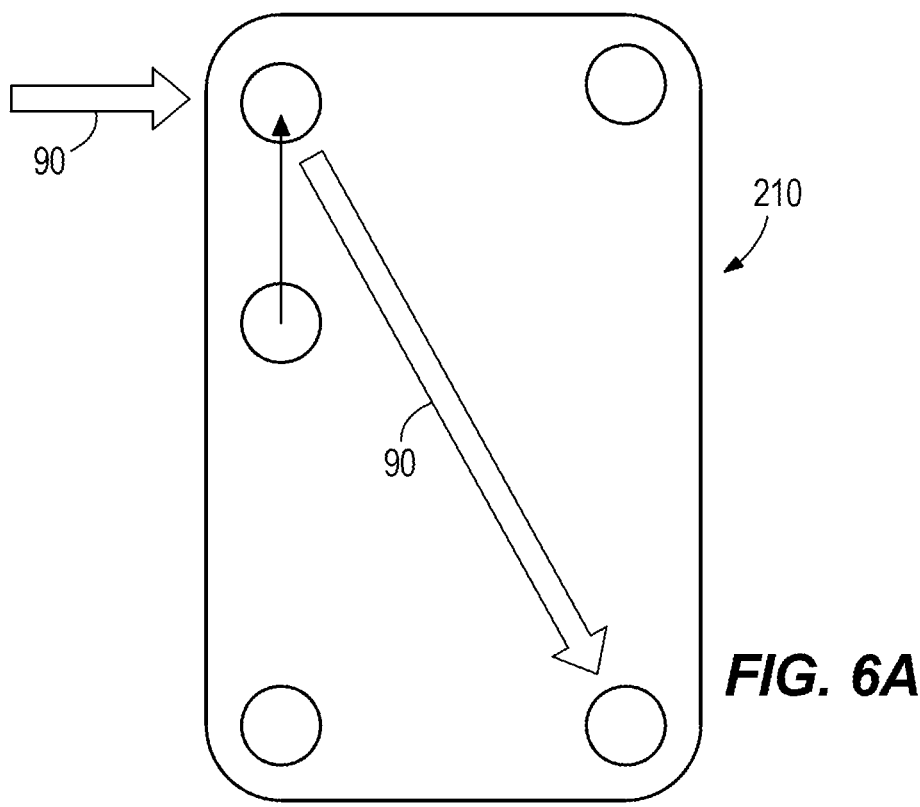
FIG. 6A is a schematic view of the embodiment of FIG. 5 according to one embodiment.
Figure 6B:
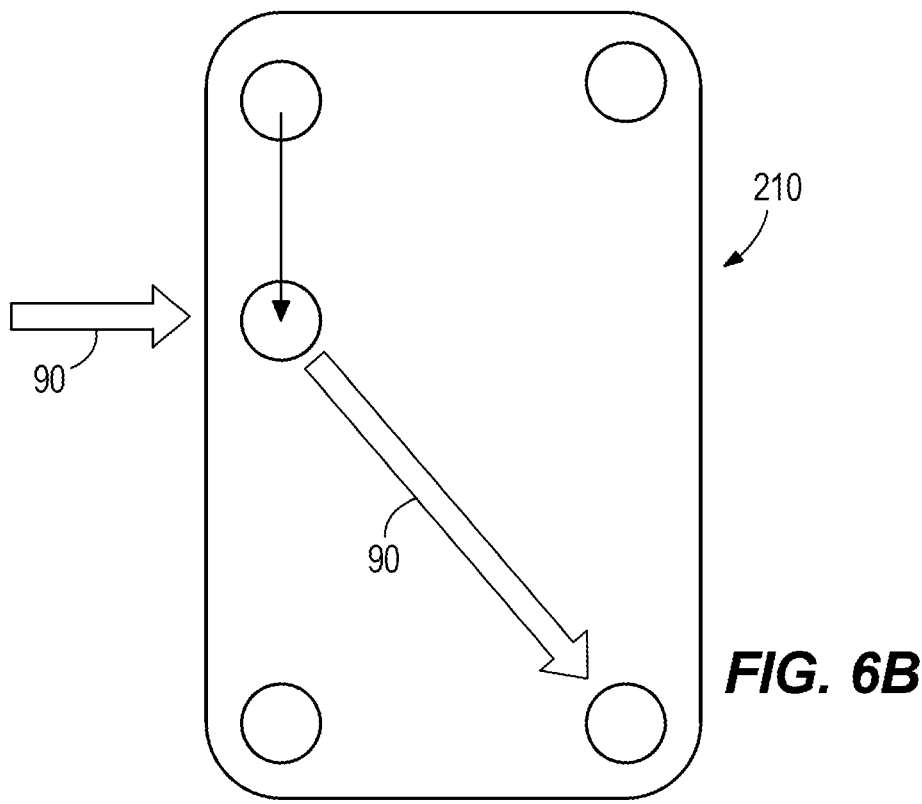
FIG. 6B is a schematic view of the embodiment of FIG. 5 according to one embodiment.
Figure 6C:
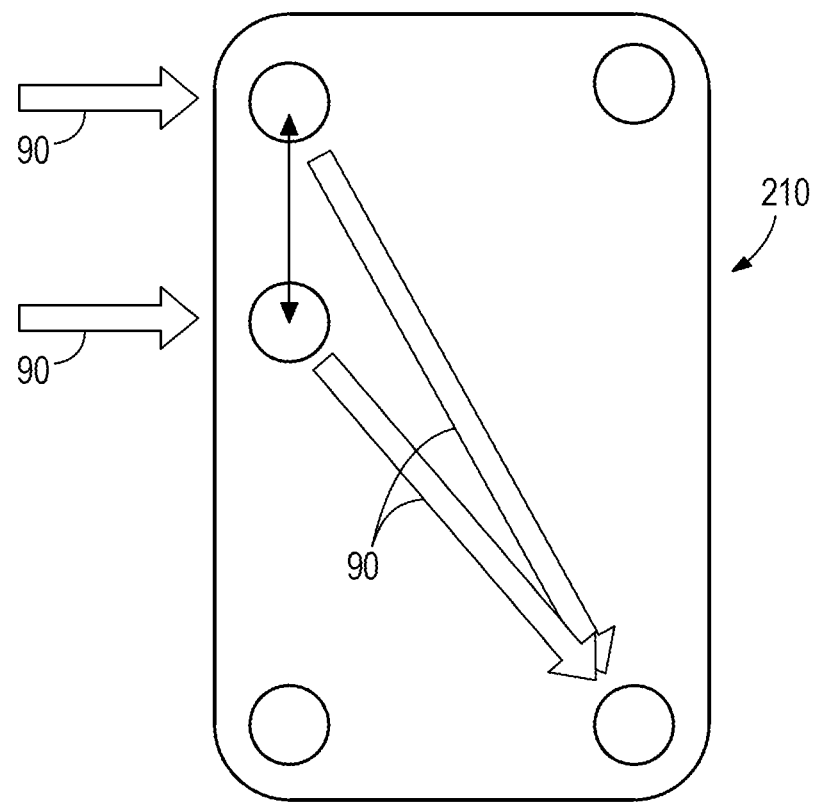
FIG. 6C is a schematic view of the embodiment of FIG. 5 according to one embodiment.

FIGS. 5 and 6A-6C depict another embodiment where the heat exchanger assembly includes a core 210 formed from a stack of plates 212. The core 210 includes refrigerant inlet manifolds 218 and a refrigerant outlet manifold 220. The core 210 also includes a coolant inlet manifold 214 and a coolant outlet manifold 216. The plates 212 are stacked to provide refrigerant channels 230 that alternate with coolant channels 232 to transfer heat between adjacent refrigerant and coolant channels. This embodiment also includes the valve assembly 30 arranged upstream of the inlet manifolds 218. The valve assembly 30 is controlled to cycle to reset the refrigerant preventing equilibrium of the liquid and vapor within the core. Thus, liquid flow is reset at the entrance of the inlet manifolds 218. In some embodiments, the core 210 includes only a single inlet manifold 218. Such embodiments may include the distribution valve assembly 40, which is shown in FIG. 5 and operates as described above. Refrigerant lines (not shown) are provided from the valve assembly 30 to opposite sides of the distribution valve assembly 40, which is contained within a valve housing or channel. The distribution valve assembly 40 selectively directs the flow of refrigerant to one of the inlet manifold 218.

Figure 7:
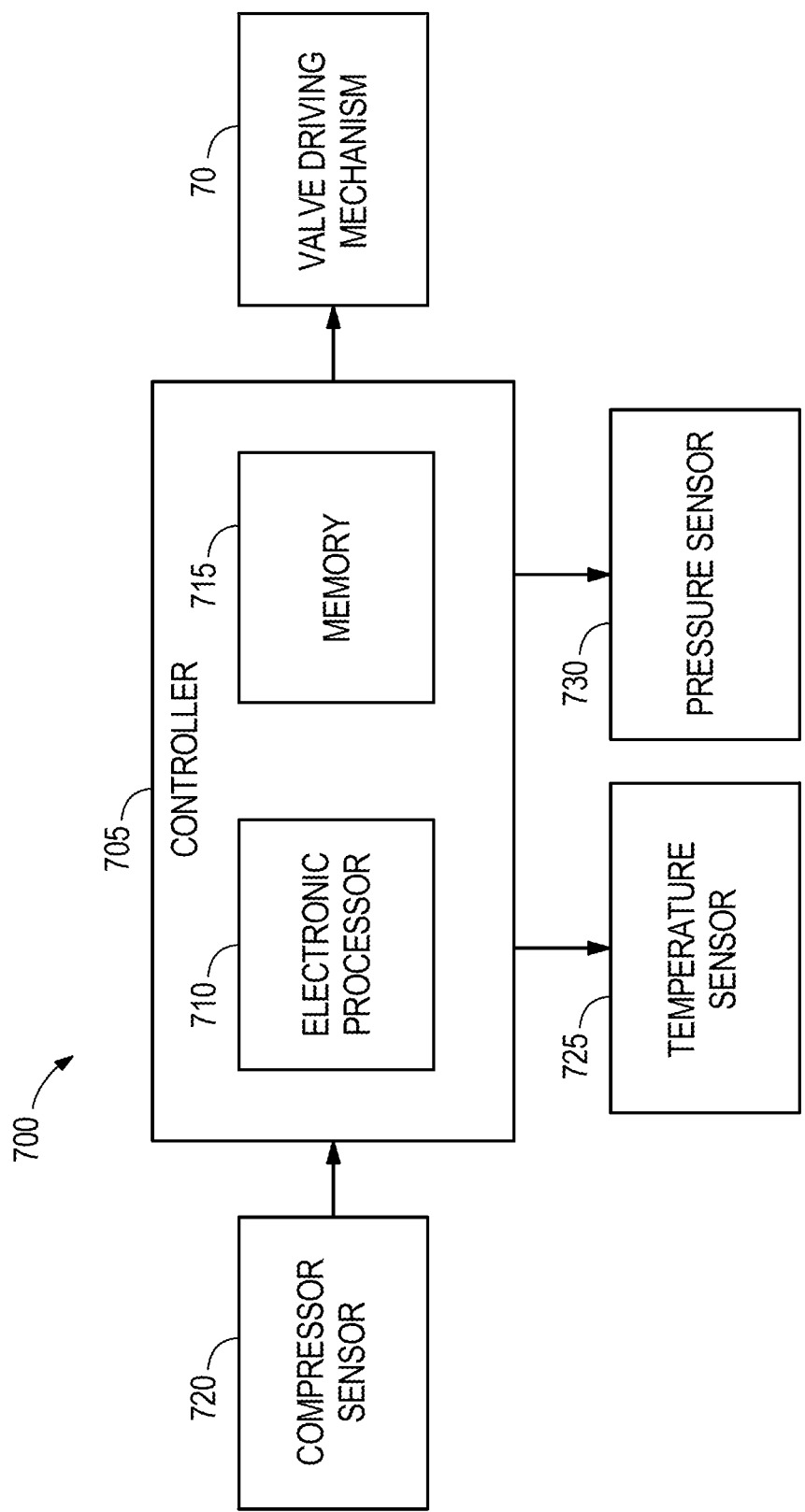
FIG. 7 is a block diagram of a control system of the heat exchanger assembly FIG. 1 according to one embodiment.

FIG. 7 provides a control system 700 for the heat exchanger assembly of FIG. 1. The control system 700 includes a controller 705, a compressor sensor 720, a temperature sensor 725, a pressure sensor 730, and the driving mechanism 70. In some embodiments, the control system 700 may include only a single one of the compressor sensor 720, the temperature sensor 725, the pressure sensor 730, or otherwise any combination thereof. For example, in some preferred embodiments, the temperature sensor 725 and the pressure sensor 730 are included in the control system 700. The controller 705 includes an electronic processor 710 (for example, a programmable microprocessor, a microcontroller, programmable logic controller, or other suitable device) and a memory 715.

The memory 715 is a non-transitory computer readable medium that includes, for example, a program storage area and a data storage area. The program storage area and the data storage area can include combinations of different types of memory, for example read-only memory ("ROM"), random access memory ("RAM") (for example, dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. In one example, the electronic processor 710 is connected to the memory 715 and executes software instructions that are capable of being stored in a RAM of the memory 715 (for example, during execution), a ROM of the memory 715 (for example, on a generally permanent basis), or another non-transitory computer-readable medium. Software included in the implementation of the driving mechanism 70 can be stored in the memory 715. The software includes, for example, firmware, one or more applications, program data, filters, rules, one or more program modules, and other executable instructions. The electronic processor 710 is configured to retrieve from the memory 715 and execute, among other things, instructions related to the control processes and methods described herein.

The compressor sensor 720 is configured to provide signals to the controller 705 indicative of the rotation speed (e.g., a rate per minute [RPM]) of a compressor (not shown) that drives refrigerant through the heat exchanger assembly of FIG. 1. The speed of the compressor impacts the overall pressure of the refrigerant in the heat exchanger assembly, which will impact the ratio of liquid versus gaseous refrigerant within the system. As a result, the compressor speed may indicate a total refrigerant capacity of the heat exchanger assembly even though the volume of the heat exchanger assembly remains fixed.

The temperature sensor 725 is configured to provide signals to the controller 705 indicative of a temperature of the refrigerant 90. The temperature sensor 725 may detect the temperature of the refrigerant 90, for example, at the inlet manifold 112, the outlet manifold 114, the refrigerant inlet manifolds 218, the refrigerant outlet manifold 220, or another location having a flow of the refrigerant 90. The pressure sensor 730 is configured to provide signals to the controller 705 indicative of a pressure of the refrigerant 90. The pressure sensor 730 may detect a pressure of the refrigerant 90, for example, at the inlet manifold 112, the outlet manifold 114, the refrigerant inlet manifolds 218, the refrigerant outlet manifold 220, or another location.

Figure 8:
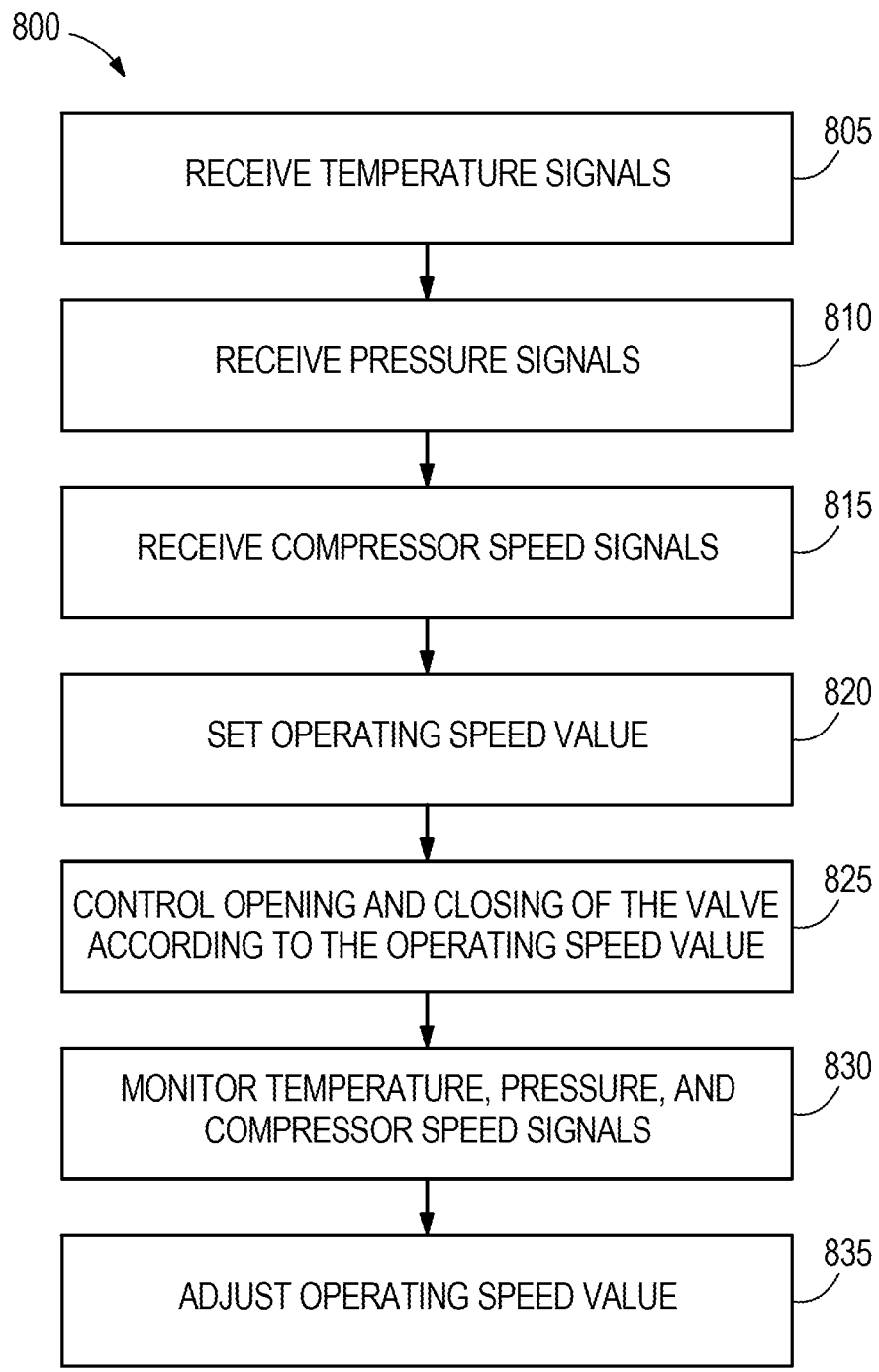
FIG. 8 is a block diagram of a method performed by the control system of FIG. 7 according to one embodiment.

As previously stated, the valve 72 may be actuated in a pulsing manner to reset (e.g., disrupt) the flow of refrigerant and prevent an equilibrium state of the two phases of the refrigerant within the heat exchanger assembly. FIG. 8 provides a method 800 performed by the controller 705 for resetting the flow of refrigerant. At block 805, the controller 705 receives temperature signals from the temperature sensor 725. The controller 705 may determine a temperature of the refrigerant 90 based on the temperature signals. At block 810, the controller 705 receives pressure signals from the pressure sensor 730. The controller 705 may determine a pressure of the refrigerant 90 based on the pressure signals. At block 815, the controller 705 receives speed signals from the compressor sensor 720. The controller 705 may determine a speed of the compressor based on the speed signals.

At block 820, the controller 705 sets an operating frequency based on at least one of the temperature signals, the pressure signals, and the speed signals. For example, the memory 715 may store a control curve used by the controller 705 to set the operating frequency. The temperature of the refrigerant 90, the pressure of the refrigerant 90, and the speed of the compressor may be used as inputs to the control curve. The operating frequency may be set to a value between approximately 0 Hz and 500 Hz. In some embodiments, the operating frequency is set to a value between approximately 80 Hz and 250 Hz. When the operating frequency is set to 0 Hz, the controller 705 may be configured to reset the valve 72 (and therefore flow of the refrigerant 90) after a predetermined time period has been satisfied. For example, the controller 705 resets the valve 72 every 5 minutes, every 10 minutes, or the like.

At block 825, the controller 705 controls opening and closing of the valve 72 (i.e., actuation of the valve 72) according to the operating frequency. For example, the controller 705 may provide a pulse width modulation (PWM) signal having the set operating frequency to the driving mechanism 70 (e.g., the solenoid or motor). The valve 72 then opens and closes at a frequency equal to the operating frequency. In some embodiments, opening and closing the valve 72 includes moving the valve 72 from a minimum movement position (e.g., a first valve position) to a maximum movement position (e.g., a second valve position). For example, the valve 72 may move from a location that is 0% of possible actuation (which allows no refrigerant flow or minimum refrigerant flow to pass through the valve 72) to a location that is 100% of possible actuation (which allows maximum refrigerant flow through the valve 72). In other embodiments, opening and closing the valve 72 includes moving the valve 72 from a percentage of possible movement, such as from 20% of possible actuation to 99% of possible actuation. Flow rates through the valve 72 correlate to the percentage of possible movement of the valve. The correlation can be linear, exponential, or another correlation. A flow rate of the refrigerant 90 may be different at the first valve position than the second valve position. For example, when the first valve position is a closed position, the flow rate of the refrigerant 90 is significantly less than when compared to when the first valve position is a fully opened position.

At block 830, the controller 705 continues to monitor and/or receive at least one new temperature, pressure, and new speed signals from the temperature sensor 725, the pressure sensor 730, and the compressor sensor 720, respectively. At block 835, the controller 705 adjusts the operating frequency based on the new temperature, pressure and speed signals. For example, the new temperature, pressure, and speed signals are compared to the control curve stored in the memory 715. The controller 705 then returns to block 825 to control opening and closing of the valve 72 according to the adjusted operated frequency. In this manner, the controller 705 adjusts the operating frequency as conditions of the refrigerant 90 change throughout operation of the heat exchanger assembly.

In some embodiments, the controller 705 may only use a single one of the temperature signals, the pressure signals, or the speed signals to set the operating frequency of the valve 72. For example, the control curve stored in the memory 715 may provide an operating frequency for a given temperature, a given pressure, or a given speed of the compressor. In other embodiments, the controller 705 may use any combination of two of the temperature, pressure, and speed signals to set the operating frequency of the valve 72. In yet other embodiments, the controller 705 no sensor signal to set the operating frequency of the valve 72, and instead sets and/or adjusts the operating frequency of the valve 72 based on a value stored in the memory 715.

Figure 9B:
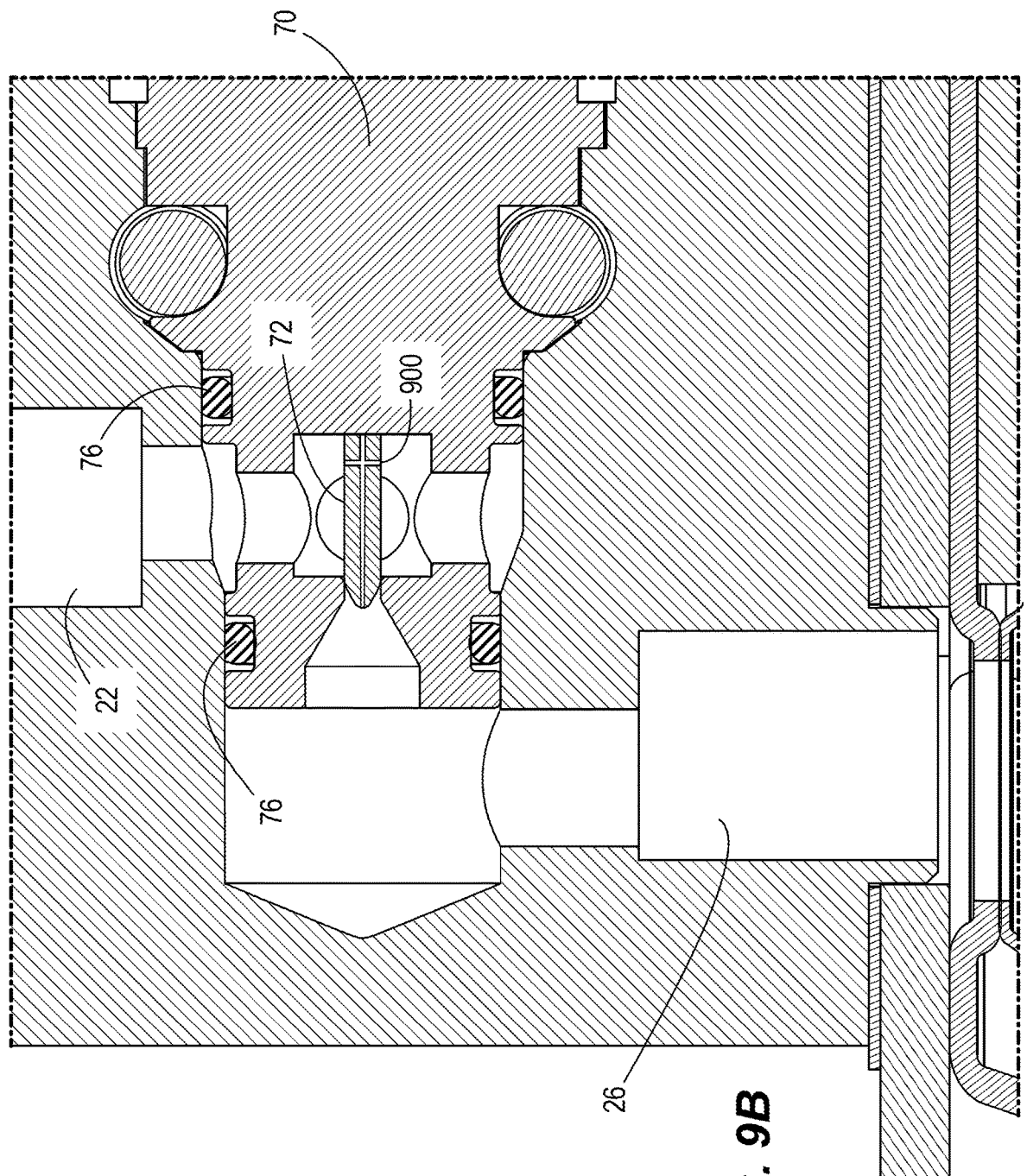
FIG. 9B is another side view of the expansion valve configuration of FIG. 1 according to one embodiment.

In some situations, control of the valve 72 to exactly 100% of it's actuation range (e.g., the closed position) may be difficult. Further slamming of the valve 72 to the closed position may be detrimental to the system. Additionally, some systems may not be capable of precise actuation of the valve 72 to a given position. Accordingly, in some embodiments, the valve 72 includes an internal passage 900, shown in FIGS. 9A and 9B. FIG. 9A illustrates the valve 72 in an open position. When the valve 72 is opened, the internal passage 900 is in a closed position. FIG. 9B illustrates the valve 72 in a closed position. When the valve 72 is closed, the internal passage 900 is in an open position, and allows a metered flow of refrigerant 90 to pass through the valve 72. The metered flow is dependent on the size (e.g., diameter) of the internal passage 900. The metered flow functions to avoid the "slamming" full closure of the valve 72, and thus extends the life of the system. Further, in cases where precise actuation of the system is not possible, the valve 72 can still operate to actuate the valve between extreme valve positions, which does not require precise actuation. However, the internal passage 900 functions such that the flow of refrigerant is subjected to a valve position between 100% (the fully open position) and the metered flow (at the "closed" position). As a result, the valve 72 actuates between 100% flow and the metered flow without precise control of the valve 72.

Figure 10:
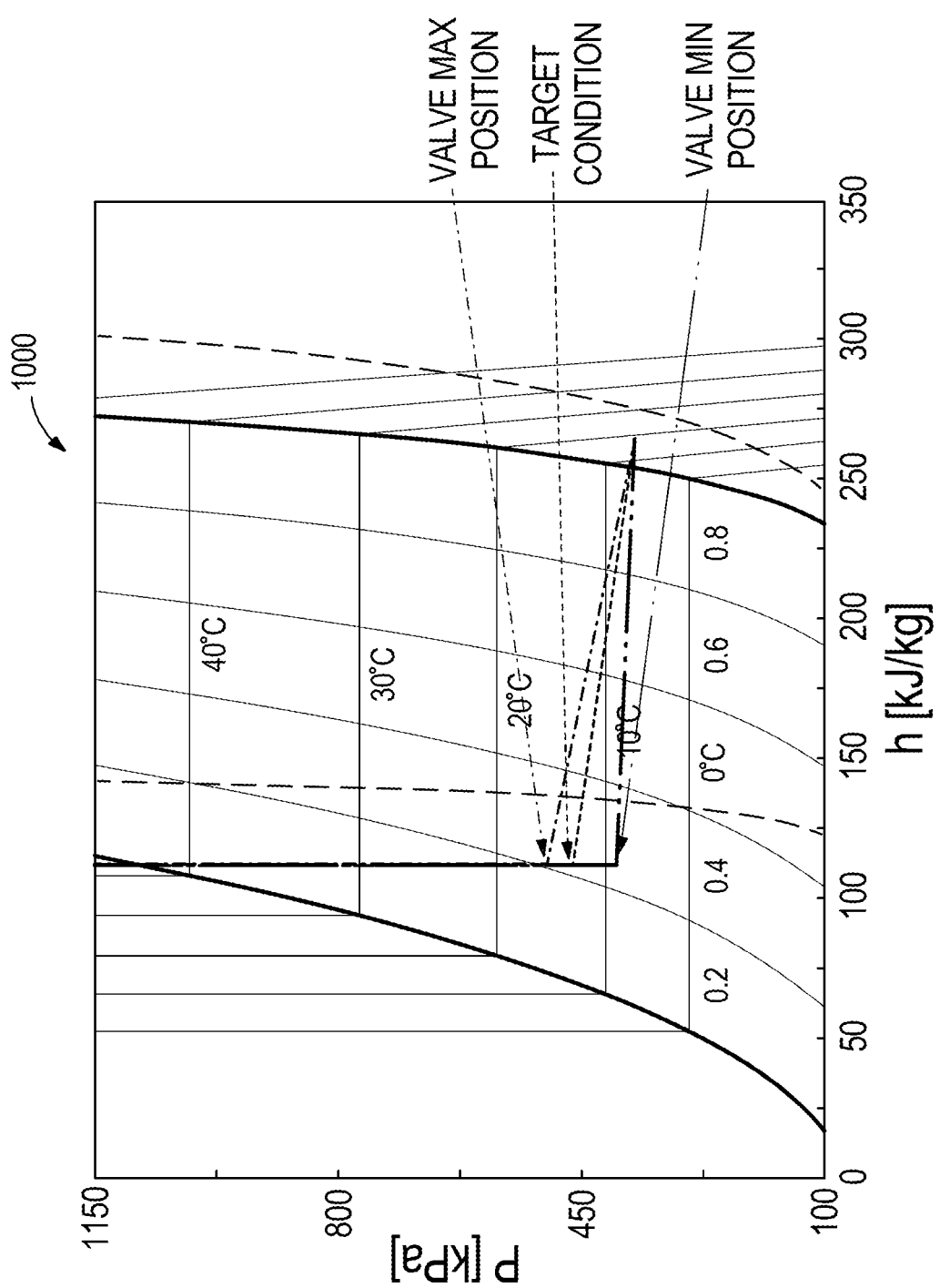
FIG. 10 is a pressure-enthalpy graph for a valve actuation cycle according to one embodiment.

FIG. 10 provides a pressure-enthalpy ("P-h") graph 1000 for a given temperature. The pressure-enthalpy graph 1000 illustrates how actuation of the valve 72 influences the cycle of pressure and enthalpy for the refrigerant 90. The three indicated lines on the graph 1000 represent three different operating positions of the valve 72. The "target condition" represents the fixed position that a non-oscillating valve would be in. The "Valve max" and "Valve min" lines represent the two positions an oscillating valve as described herein would cycle between. The "Valve max" line on the P-h graph yields a minimum pressure drop through the valve 72 and the "Valve min" line on the P-h graph yields a maximum pressure drop through the valve 72. By oscillating, the valve 72 achieves the "target condition" even though the valve 72 is not held in a fixed position.

Thus, embodiments provide, among other things, a heat exchanger assembly with valve control. Various features, advantages, and embodiments are set forth in the following claims.

What is claimed is:

1. A method for disrupting a flow of refrigerant through a heat exchanger, the method comprising:
receiving, with a controller, a first signal from a first sensor, the first signal indicative of a pressure of the refrigerant flowing through the heat exchanger,
receiving, with the controller, a second signal from a second sensor, the second signal indicative of a temperature of the refrigerant,
setting, with the controller, an operating frequency of a valve based on the first signal and the second signal, wherein the valve regulates refrigerant flow through the heat exchanger, and wherein the operating frequency includes a rate at which the valve actuates between a first valve position that sets a first refrigerant flow rate through the heat exchanger and a second valve position that sets a second refrigerant flow rate through the heat exchanger, and
controlling, with the controller, operation of a solenoid to actuate the valve at the operating frequency,
wherein the refrigerant includes refrigerant in the liquid phase and refrigerant in the gaseous phase, and
wherein actuating the valve at the operating frequency disrupts the flow of the refrigerant through the heat exchanger such that when the valve is moved from the first valve position to the second valve position, the refrigerant in the liquid phase is more equally distributed through the heat exchanger.

2. The method of claim 1, further comprising:
receiving, with the controller, a third signal from a third sensor, the third signal indicative of a rotation speed of a compressor, the compressor configured to flow the refrigerant through the heat exchanger, and
setting, with the controller, the operating frequency based on the first signal, the second signal, and the third signal.

3. The method of claim 1, wherein the operating frequency has a value between 0 Hz and 500 Hz, and wherein the first refrigerant flow rate is a maximum flow rate through the heat exchanger and the second refrigerant flow rate is zero.

4. The method of claim 3, wherein the operating frequency has a value between 80 Hz and 250 Hz.

5. The method of claim 1, further comprising:
receiving, with the controller and after setting the operating frequency, an additional signal from the first sensor,
adjusting, with the controller, the operating frequency based on the additional signal to set an adjusted operating frequency, and
controlling, with the controller, operation of the solenoid to actuate the valve at the adjusted operating frequency.

6. The method of claim 1, wherein setting the operating frequency includes setting the operating frequency based on a control curve stored in a memory of the controller.

7. The method of claim 1, the second refrigerant flow rate is greater than zero and the first refrigerant flow rate is a maximum flow rate through the heat exchanger.

8. A control system for disrupting a flow of refrigerant through a heat exchanger, the control system comprising:
a valve for regulating the flow of refrigerant through the heat exchanger,
a solenoid coupled to the valve that actuates the valve;
a first sensor that provides signals indicative of a pressure of the flow of refrigerant within the heat exchanger;
a second sensor configured to provide signals indicative of a temperature of the refrigerant; and
a controller coupled to the solenoid and the sensor, the controller including an electronic processor and a memory, the controller configured to:
receive a first signal from the first sensor,
receive a second signal from the second sensor,
set an operating frequency of the valve based on the first signal and the second signal, wherein the operating frequency includes a rate at which the valve actuates between a first valve position that sets a first refrigerant flow rate through the heat exchanger and a second valve position that sets a second refrigerant flow rate through the heat exchanger, and
control operation of the solenoid to actuate the valve at the operating frequency,
wherein the flow of refrigerant includes refrigerant in the liquid phase and refrigerant in the gaseous phase, and
wherein actuating the valve at the operating frequency disrupts the flow of the refrigerant through the heat exchanger such that, when the valve is moved from the first valve position to the second valve position, the refrigerant in the liquid phase is more equally distributed through the heat exchanger.

9. The control system of claim 8, further comprising a third sensor configured to provide signals indicative of a rotation speed of a compressor, and wherein the controller is further configured to:

receive a third signal from a third sensor, and
set the operating frequency based on the first signal, the second signal, and the third signal.

10. The control system of claim 8, wherein the operating frequency has a value between 0 Hz and 500 Hz, and wherein the first refrigerant flow rate is a maximum flow rate through the heat exchanger and the second refrigerant flow rate is zero.

11. The control system of claim 10, wherein the operating frequency has a value between 80 Hz and 250 Hz.

12. The control system of claim 8, wherein the controller is further configured to:
receive, after setting the operating frequency, an additional signal from the first sensor,
adjust the operating frequency based on the additional signal to set an adjusted operating frequency, and
control operation of the solenoid to actuate the valve at the adjusted operating frequency.

13. The control system of claim 8, wherein the controller is configured to set operating frequency based on a control curve stored in the memory.

14. The control system of claim 8, wherein the second refrigerant flow rate is greater than zero and the first refrigerant flow rate is a maximum flow rate through the heat exchanger.

15. A heat exchanger assembly comprising:
a heat exchanger core including a refrigerant channel, an inlet manifold, and an outlet manifold;
a valve configured to regulate refrigerant flow into the heat exchanger core,
a solenoid that actuates the valve between a first valve position that sets a first refrigerant flow rate through the heat exchanger core and a second valve position that sets a second refrigerant flow rate through the heat exchanger core;
a pressure sensor configured to provide pressure signals indicative of a pressure of refrigerant within the refrigerant channel;
a temperature sensor configured to provide temperature signals indicative of a temperature of refrigerant within the refrigerant channel; and
a controller including an electronic processor and a memory, the controller configured to:
receive a first signal from the first sensor,
receive a second signal from the second sensor,
set an operating frequency of the valve based on the first signal and the second signal, wherein the operating frequency is the rate at which the valve actuates between the first valve position and the second valve position, and
control operation of the solenoid to actuate the valve at the operating frequency.

16. The heat exchanger assembly of claim 15, wherein the controller is further configured to:
receive, after setting the operating frequency, an additional signal from the sensor, wherein the operating frequency is a first operating frequency,
set a second operating frequency based on the additional signal, wherein the second operating frequency is different than the first operating frequency, and
control operation of the solenoid to actuate the valve at the second operating frequency.

* * * * *